United States Patent
Meng et al.

(10) Patent No.: US 11,082,529 B2
(45) Date of Patent: Aug. 3, 2021

(54) PREDICTION ENGINE FOR A NETWORK-BASED SERVICE

(71) Applicant: Uber Technologies, Inc., San Francisco, CA (US)

(72) Inventors: Shicong Meng, Fremont, CA (US); Noah Harold Shaw, San Francisco, CA (US); Joshua K. Hellerstein, Palm Beach Gardens, FL (US); Juan Pemberthy, San Francisco, CA (US); Zhi Li, San Francisco, CA (US); Jacob Edison, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 1 day.

(21) Appl. No.: 16/654,365

(22) Filed: Oct. 16, 2019

(65) Prior Publication Data
US 2020/0128101 A1 Apr. 23, 2020

Related U.S. Application Data

(60) Provisional application No. 62/749,413, filed on Oct. 23, 2018.

(51) Int. Cl.
*G06F 15/173* (2006.01)
*H04L 29/08* (2006.01)
*H04L 12/24* (2006.01)

(52) U.S. Cl.
CPC ........ *H04L 67/322* (2013.01); *H04L 41/0823* (2013.01); *H04L 41/145* (2013.01);
(Continued)

(58) Field of Classification Search
CPC . H04L 67/322; H04L 41/0823; H04L 41/147; H04L 41/145; H04L 41/16;
(Continued)

(56) References Cited

U.S. PATENT DOCUMENTS

| | | | | |
|---|---|---|---|---|
| 2012/0173136 A1* | 7/2012 | Ghoting | ............. | G01C 21/3453 701/411 |
| 2016/0129787 A1* | 5/2016 | Netzer | ............. | G08G 1/096741 701/36 |

FOREIGN PATENT DOCUMENTS

| | | | | |
|---|---|---|---|---|
| CN | 102881152 | * | 9/2015 | ............... G08G 1/00 |
| CN | 107919014 | * | 4/2018 | ............. G06Q 10/04 |

OTHER PUBLICATIONS

ISR and Written Opinion in PCT/US2019/057055 dated Feb. 4, 2020.

* cited by examiner

*Primary Examiner* — Thanh T Nguyen
(74) *Attorney, Agent, or Firm* — Mahamedi IP Law LLP

(57) ABSTRACT

Service providers can be identified to fulfill service requests of a network-based service. A network system is configured to generate, based on historical data associated with the network-based service, a machine-learned service provider optimization (MLSPO) model for generating service provider optimizations. The optimizations can include action recommendations that optimize one or more service metrics. The MLSPO model can be a reinforcement learning model generated by performing a plurality of simulations utilizing one or more virtual agents. A provider device of a service provider can transmit a set of data to the network system that indicates a current location of the service provider. Based on the current location and the MLSPO model, the network system can generate service provider optimizations. Optimization data can be transmitted to the provider device so that the provider device can display information corresponding to the service provider optimizations.

20 Claims, 7 Drawing Sheets

(52) U.S. Cl.
CPC ............ *H04L 41/147* (2013.01); *H04L 41/16* (2013.01); *H04L 41/22* (2013.01); *H04L 41/5025* (2013.01); *H04L 41/5054* (2013.01); *H04L 67/16* (2013.01); *H04L 67/325* (2013.01); *H04L 67/36* (2013.01)

(58) Field of Classification Search
CPC . H04L 41/22; H04L 41/5025; H04L 41/5054; H04L 67/16; H04L 67/325; H04L 67/36
See application file for complete search history.

PREDICTION ENGINE FOR A NETWORK-BASED SERVICE

CROSS-REFERENCE TO RELATED APPLICATIONS

This application claims benefit of priority to U.S. Provisional Patent Application No. 62/749,413, filed on Oct. 23, 2018, and titled "Prediction Engine"; the aforementioned application being hereby incorporated by reference in its entirety.

BACKGROUND

A network-based service can enable users to request and receive various network-based services through applications on mobile computing devices. The network-based service can match a service provider with a requesting user based on the current location of the service provider and a start location specified by the requesting user or determined based on the current location of the requesting user.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
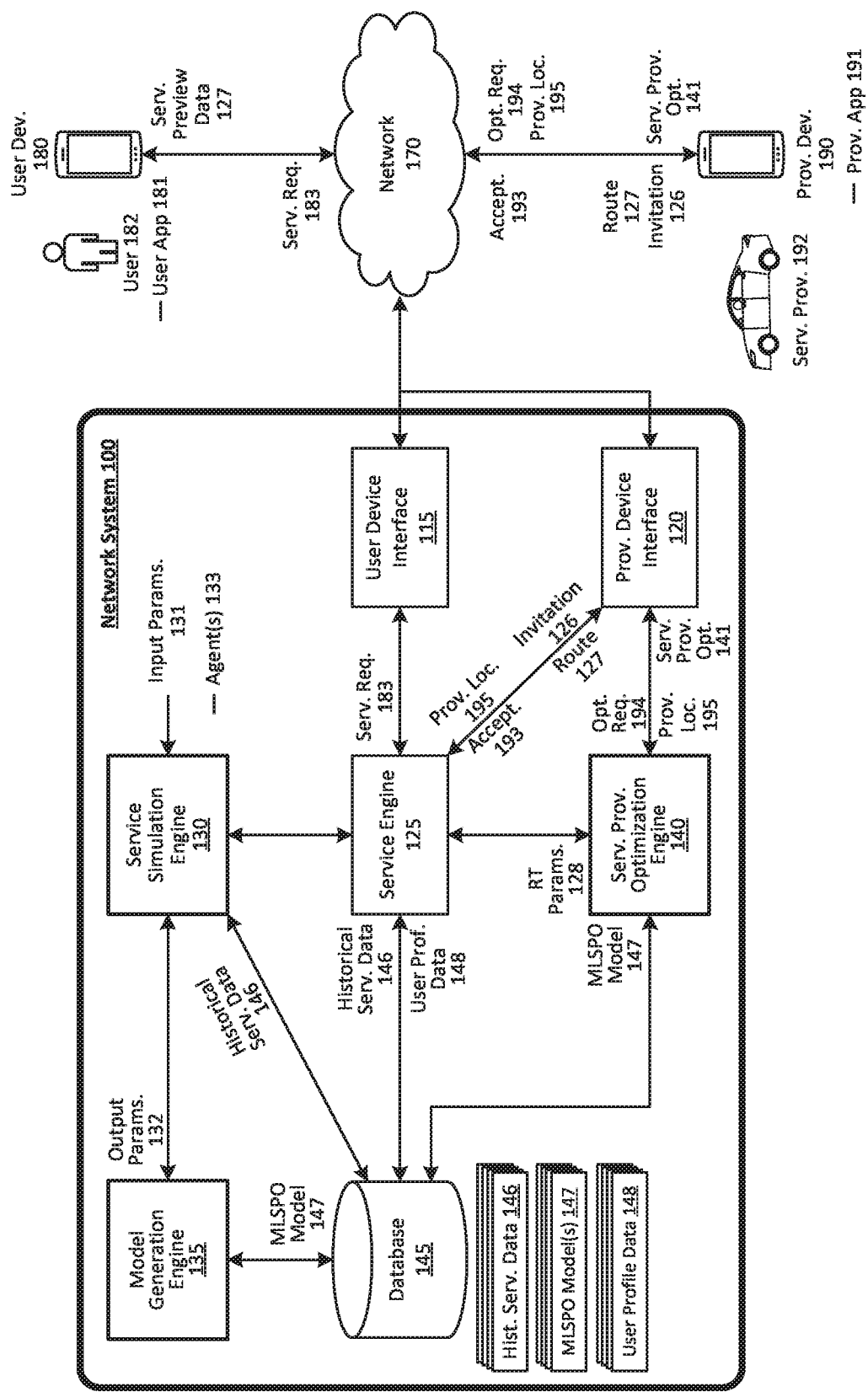
FIG. 1 is a block diagram illustrating an example network system in communication with user devices and provider devices, in accordance with examples described herein.

A network system is provided herein that manages a network-based service (e.g., a transport service, a delivery service, etc.) linking available service providers (e.g., drivers and/or autonomous vehicles (AVs)) with requesting users (e.g., riders, service requesters) throughout a given region (e.g., San Francisco Bay Area). In doing so, the network system can receive requests for service from requesting users via a designated user application executing on the users' mobile computing devices ("user devices"). Based on a start location (e.g., a pick-up location where a service provider is to rendezvous with the requesting user), the network system can identify an available service provider and transmit an invitation to a mobile computing device of the identified service provider ("provider device"). Should the identified service provider accept the invitation, the network system can transmit directions to the provider device to enable the service provider to navigate to the start location and subsequently from the start location to a service location (e.g., a drop-off location where the service provider is to complete the requested service). The start location can be specified in the request and can be determined from a user input or from one or more geo-aware resources on the user device. The service location can also be specified in the request.

In determining an optimal service provider to fulfill a given service request, the network system can identify a plurality of candidate service providers to service the service request based on a start location indicated in the service request. For example, the network system can determine a geo-fence surrounding the start location (or a geo-fence defined by a radius away from the start location), identify a set of candidate service providers (e.g., twenty or thirty service providers within the geo-fence), and select an optimal service provider (e.g., closest service provider to the start location, service provider with the shortest estimated travel time from the start location, service provider traveling or en-route to a location within a specified distance or specified travel time to a service location, etc.) from the candidate service providers to service the service request. In many examples, the service providers can either accept or decline the invitation based on, for example, the route being too long or impractical for the service provider. After accepting the invitation, the selected service provider can proceed to the start location to, for example, rendezvous with the requesting user. The selected service provider can then proceed in providing the requested service to the service location. While the service provider is operating the vehicle to the start location or to the service location, the provider device can generate directions (e.g., turn-by-turn navigation directions) to aid the service provider in navigating to the various locations. The directions can be displayed via the provider application or via a third-party mapping or navigation application.

After the service provider completes the requested service, and prior to accepting another invitation to fulfill anther service request, the service provider can be described as being on an off-service segment. During this time period, the service provider can take various actions. As one example, the service provider can navigate to another location. As another example, the service provider can remain at the same location (e.g., service location of the previous service request) while waiting for the next invitation. Service provider can also enter an offline state with respect to the network-based service. As used herein, the offline state can be used to mean a state in which the service provider is not available to fulfill service requests. The service provider can elect to enter the offline state via the provider application. In some variations, the offline state can be implemented as a server-side function. In other words, the network system can decide to not transmit any invitations to the provider device while the service provider is in the offline state. In other variations, the offline state can be implemented as a client-side function where the provider application automatically rejects any invitations received while the service provider is in the offline state.

While on the off-service segment, the service provider may wish to take particular actions to improve one or more aspects of the network-based service for himself or herself. For example, the service provider may wish to increase or maximize his or her expected fares received from fulfilling service requests of the network-based service. In addition to or as an alternative, the service provider may wish to decrease or minimize the length of time of or distance traveled while on the off-service segment (e.g., minimizing expected time and/or distance traveled to the start location of the next service request). Furthermore, the service provider may wish to decrease or minimize the distance he or she would have to travel to rendezvous with requesting users.

In various implementations, the embodiments described herein provided for a network system that can generate optimizations for service providers to improve one or more service metrics (e.g., increase expected earnings, reduction in travel times, reduction in travel distances, etc.) associated with the network-based service. At a high-level, the network system can generate, based on historical data associated with the network-based service, one or more machine-learned service provider optimization (MLSPO) models for generating service provider optimizations. As used herein, service provider optimizations can include routing directions (e.g., navigation instructions) and/or suggestions for performing actions (e.g., entering and exiting offline mode, etc.) to optimize (e.g., maximize or minimize) one or more service metrics for the service provider in fulfilling future service requests. In one example, the network system can generate MLSPO models that generate service provider optimizations that increase or maximize expected fares of the service provider. In another example, the network system can generate MLSPO models that output service provider optimizations that decrease or minimize distances traveled by the service provider in-between service requests (e.g., from previous service location to subsequent start location).

In one aspect, embodiments described herein can predict, based on historical service data, one or more expected service metrics for service providers given various service provider routes and/or actions and can identify for the service provider routes and/or actions that would optimize the one or more service metrics. The predictions can be results of machine-learning, such as deep reinforcement learning, in which agent-based simulations are performed using the historical service data.

As used herein, the terms "optimize," "optimization," "optimizing," and the like are not intended to be restricted or limited to processes that achieve the most optimal outcomes. Rather, these terms encompass technological processes (e.g., heuristics, stochastics modeling, machine learning, reinforced learning, Monte Carlo methods, Markov decision processes, etc.) that aim to achieve desirable results. Similarly, terms such as "minimize" and "maximize" are not intended to be restricted or limited to processes or results that achieve the absolute minimum or absolute maximum possible values of a metric, parameter, or variable.

According to embodiments, an input to the MLSPO models is the current location of the service provider. The network system can receive location data generated by the provider device that indicates the current location of the service provider. Based on the current location of the service provider and the MLSPO model, the network system can generate optimizations for the service provider. Optimization data can be transmitted by the network system to the provider device. In response to receiving the optimization data, the provider device can display information regarding the service provider optimizations to the service provider.

According to embodiments, the service provider optimizations can correspond to one or more action recommendations for the service provider and can include a recommended direction of travel for the service provider while the service provider is traveling on an off-service segment. The recommended direction of travel can be a direction of travel and/or a route of travel for the service provider to follow on the off-service segment that would, based on the MLSPO model, achieve optimal expected values of one or more service metrics (e.g., for one or more future fulfillments of service requests) given the service provider's current location. In some implementations, the route direction generated by the MLSPO model can be a direction of travel or an angle of travel from a reference direction (e.g., North). In response to receiving the optimization data, the provider device can be configured to display information to the service provider based on the direction of travel. For instance, the provider device can display the recommendations to the service provider to travel in a general direction or towards a nearby landmark. In another aspect, the angle of travel from the reference direction can be converted to a route direction (e.g., a navigation route along streets and throughways that is determined to align with the angle of travel) such that the provider device can display a navigation route to the service provider to follow the recommendation. The route direction can be generated based on the angle of travel and the service provider's current location. According to variations, the service provider optimizations can further include action suggestions. For example, an action suggestion for the service provider can be for the service provider to enter or exit the offline state during the in-between service requests time period.

Depending on the implementation, the network system can generate service provider optimizations in response to data transmitted from the provider device (or automatically based on monitoring the location and/or service progress of the service provider). In one variation, the provider device can transmit an optimization request to the network system to trigger the generation of service provider optimizations. The optimization request can be transmitted by the provider device in response to the service provider interacting with the provider application (e.g., via a dedicated soft feature selection of within the provider application). In some instances, the network system can generate service provider optimizations in response to receiving an indication that the service provider has completed providing requested services for a requesting user or the network system can interpret a service completion indication received from the provider device as the optimization request. In other variations, the network system can automatically generate the optimizations for the service provider by monitoring the location of the service provider or the progress of a requested service. As one example, the network system can communicate with the provider device (e.g., by periodically receiving location data) to monitor the location of the service provider. And in response to determining that the provider device is within a predetermined distance of the service location, the network system can be triggered to begin the process of determining service provider optimizations for the service provider. As another example, in response to receiving a service provider's acceptance of an invitation to fulfill a service request to a service location, the network system can begin to generate optimizations for the service provider based on the machine-learned models and the service location (and/or the estimated arrival time at the service location). In these manners, the optimizations can be readily transmitted to the provider device when the service provider completes the requested service at the service location.

According to embodiments, various service metrics associated with the network-based service can be optimized as described herein. And different MLSPO models can be generated for optimizing estimated or expected service metrics. In one example, one or more MLSPO models can be generated to optimize (e.g., maximize) fare(s) the service provider can expect to receive over a given time period in exchange for fulfilling service requests. In another example, other MLSPO models can be generated to optimize (e.g., minimize) distances the service provider can expect to travel.

As can be appreciated, the machine-learned models to generate service provider optimizations can be trained by a number of different machine-learning techniques. In certain implementations, reinforcement learning can be utilized and a plurality of simulations of a virtual agent in fulfilling the network-based service can be performed using historical data to generate the MLSPO model. Various parameters and metrics are computed during the simulation by the network system based on historical data associated with the network system. The parameters and metrics are recorded and used to generate, train, and/or refine the machine-learned model. One or more reinforcement learning techniques, such as Q-learning, can be applied to generate one or more machine-learned models or policies based on the parameters and metrics computed during the simulations of the simulations of the network-based service.

In certain situations, such as when a large number of service providers are expected in the geographic region or a sub-region therein, the approach of utilizing single-agent simulations can have drawbacks. For example, if a large number of service providers are following the same set of service provider optimizations, the result for each service provider can be skewed or rendered suboptimal by other service providers following the same set of optimizations. To better optimize for multiple service providers, the network system can generate multi-agent MLSPO models. The multi-agent MLSPO models can be generated by performing multi-agent simulations. In such simulations, multiple virtual agents are used in simulating the network-based service.

According to embodiments, the network system can further determine one or more real-time parameters in generating service provider optimization. The real-time parameters can reflect real-time conditions of the service provider at the time the optimization is requested. Real-time parameters can include, for example, real-time demand of the network-based service in various locations in the geographic region managed by the network system, number of other service providers nearby, etc. In some implementations, the real-time parameters can be used as additional inputs to the MLSPO models to generate the service provider optimizations.

Compared to existing approaches, embodiments described herein provide for an improved and more efficient way to programmatically generate service provider optimizations. In one aspect, the network system can more efficiently utilize processing resources such that computationally-intensive aspects of generating the service provider optimizations, such as performing agent-based simulations and generating the MLSPO models, need not be performed in real-time when optimizations are desired by the service providers. Accordingly, such computations can be performed when the demand on the network system is low (e.g., overnight or during periods of low demand for the network-based service when the network system has unused processing resources). And when optimizations are requested, the network system can retrieve the MLPSO models from one or more databases and utilize the MLSPO models to generate the service provider optimizations without needing to re-perform those computationally-intensive steps of the process in real-time.

In another aspect, the network system can generate more optimal routes and action suggestions. Existing approaches to generate recommendations for service providers are simplistic approaches such as directing a service provider to nearby locations with the highest demand for the network-based service. Such recommendations are often biased towards short-term gain (e.g., for only the next service request fulfilled). In contrast, embodiments described herein generated MLPSO models based on agent-based simulations that simulate service provider actions over time periods of many hours and can also factor in other parameters such as waiting times and distance traveled. Additionally, a shortcoming of existing approaches is that when recommendations are followed by many service providers, benefits to the service providers can be greatly diminished. In contrast, embodiments described herein provide for multi-agent MLSPO models that can generate optimizations for a plurality of service providers.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user devices and provider devices, in accordance with examples described herein. Network system 100 can implement or manage a network-based service (e.g., an on-demand transport service, an on-demand delivery service, etc.) that connects requesting users 182 with service providers 192 that are available to fulfill the users' service requests 183. The network system 100 can provide a platform that enables on-demand services to be provided by an available service provider 192 for a requesting user 182 by way of a user application 181 executing on the user devices 180, and a provider application 191 executing on the provider devices 190. As used herein, a user device 180 and a provider device 190 can comprise a computing device with functionality to execute a designated application corresponding to the on-demand service managed by the network system 100. In many examples, the user device 180 and the provider device 190 can comprise mobile computing devices, such as smartphones, tablet computers, VR or AR headsets, on-board computing systems of vehicles, smart watches, and the like. In one example, a service provider fulfilling a service request includes the service provider rendezvousing with the user at start location (e.g., a pick-up location) to pick up the user and transporting the user to a service location (e.g., a destination location).

The network system 100 can include a user device interface 115 to communicate with user devices 180 over one or more networks 170 via the user application 181. According to examples, a requesting user 182 wishing to utilize the network-based service can launch the user application 181 and can cause user device 180 to transmit, by using the user application 181, a service request 183 over the network 170 to the network system 100. In certain implementations, the requesting user 182 can view multiple different service types managed by the network system 100. In the context of an on-demand transport service, service types can include a ride-share service, an economy service, a luxury service, a professional service provider service (e.g., where the service provider is certified), a self-driving vehicle service, and the like. In certain implementations, the available service types can include a rideshare-pooling service class in which multiple users can be matched to be serviced by a service provider. The user application 181 can enable the user 182 to scroll through the available service types. The user application 181 can also enable the user 182 to enter the start and service locations for a prospective service request. In some examples, the user device 180 can automatically determine the start location based on the current location of the user 182 (e.g., as determined by on-board location-aware resources).

According to embodiments, the network system 100 can include a service engine 125 that can perform a number of functions in response to receiving the service request 183 from the user device 180. For instance, in response to receiving the service request 183, the service engine 125 can identify a candidate service provider 192 to fulfill the service request 183. The service engine 125 can receive provider location data 195 transmitted from the provider devices 190 to identify an optimal service provider 192 to service the user's service request 183. The optimal service provider 192 can be identified based on the service provider 192's location, ETA to the start location, status, availability, and the like.

In various aspects, the service engine 125 can transmit an invitation 126 to the provider device 190 of the selected service provider 192. The invitation 126 can be transmitted over the network 170 via a provider device interface 120 that communicates with provider devices 190. In response to receiving the invitation 126, the provider application 191 can display a prompt for the service provider 192 to accept or decline the invitation 126. Should the service provider 192 accept the invitation 126, the provider application 191 can cause the provider device 190 to transmit an acceptance 193 to the network system 100. In response to receiving the acceptance 193 from the provider device 190, the network system 100 and the service engine 125 can perform a number of operations to facilitate the fulfillment of the requested service by the service provider 192. As an example, the service engine 125 generate an optimal route 127 for the service provider 192 to fulfilling the service request 183. The route 127 can be generated based on map data (e.g., stored in database 145 or from a third-party mapping resource). The route 127 can include a segment from the current location of the service provider 192 (e.g., based on the provider location data 195) to the start location and another segment from the start location to the service location. The route 127 can also include other intermediate locations such as a drop-off location for another user of a ride-share transport service, etc. The provider device interface 120 can transmit the route 127 to the provider device 190 via the one or more networks 170. The provider device 190 can display, via the provider application 191, turn-by-turn directions for the service provider 192 based on the route 127 generated by the service engine 125. In some implementations, the service engine 125 can transmit the start and service locations to the provider device 190 and the provider devices 190 and the provider application 191 can generate one or more routes and turn-by-turn directions for the service provider 192 necessary to fulfill the service request 183.

In various examples, the network system 100 can maintain user data for the requesting user 182 in the database 145 in the form of user profile data 148. The user profile data 148 can include information relating to services requested by the user 182 in the past, frequently visited locations associated with the network-based service (e.g., home location, office address, etc.), and the like. The user profile data 148 can also include payment information (e.g., credit/debit card information, etc.) used by the network system 100 to process the user 182's payments for the network-based service. In some implementations, the user 182 can enter payment information via the user application 181. For instance, the user 182 can be prompted, either while setting up a user account or profile for the network-based service or before submitting a request for service.

According to embodiments, the network system 100 includes service simulation engine 130, model generation engine 135, and service optimization engine 140 to generate and apply machine-learned service provider optimization (MLSPO) model(s) 147 for generating service provider optimizations 141 for the service provider 192. The service simulation engine 130 can perform a plurality of simulations of the network-based service using historical service data 146. The historical service data 146 can include some or all aspects of the past instances of the network-based service, such as fare paid, time of request (e.g., time of day and/or day of week), duration of service, location of service provider when invitation was received, time and distance traveled (e.g., from location of service provider at time of accepting invitation to start location and/or from start location to service location), and the like. Based on the historical service data 146, the service simulation engine 130 can simulate one or more instances of the network-based service for one or more agents 133.

In some examples, the service simulation engine 130 can receive input parameters 131. The input parameters 131 can be specified by system administrator at the time of the simulations or can be predetermined. In one implementation, one of the input parameters 131 can specify the metric that the process will seek to optimize. For example, expected fares for the service provider 192 over a given duration of time can specified as the metric to be optimized. A simulation time duration also be specified as one of the input parameters 131. As an example, if 12 hours is specified as the simulation time duration, the service simulation engine 130 can simulate 12 hours of activity for the agent 133. The resulting MLSPO model 147 based on the results of such simulations will generate service provider optimizations 141 that optimize a service metric (e.g., expected fares) over a 12-hour duration. In comparison, if 2 hours is specified as the simulation duration, the service simulation engine 130 can simulate 2 hours of activity for the agent 133 and the resulting MLSPO model 147 will optimize the service metric over a 2-hour duration.

According to embodiments, the service simulation engine 130 generates output parameters 132 in simulating the network-based service for the one or more agents 133. The model generation engine 135 can receive the output parameters 132 to generate MLSPO model 147. In some examples, the model generation engine can generate or train the MLSPO model 147 using reinforcement learning techniques (e.g., Q-learning, Markov decision processes, policy learning, etc.) applied to optimize (e.g., maximize or minimize) one or more of the parameters 132 generated during the simulations. Once the MLSPO model 147 is generated or trained, it can be stored within database 145 for retrieval in response to an optimization request (e.g., optimization request 194) received from the provider device 190.

The network system 100 can receive an optimization request 194 from the provider device 190 of the service provider 192. The optimization request 194 can include location data that indicates the current location of the service provider 192. For example, after service provider 192 completes fulfilling a service request, the service provider 192 can provide an indication that the requested service has been completed. In some examples, that indication can be the optimization request 194. In other examples, the service provider 192 can interact with the provider application 191 to cause the provider device 190 to transmit the optimization request 194.

According to embodiments, the network system 100 can retrieve an appropriate MLSPO model 147 from the database 145 based on the optimization request 194. The MLSPO model 147 can receive, as an input, the current location of the service provider 192 and the output of the MLSPO model 147 can be service provider optimizations 141. The service provider optimizations 141 can include a route direction for the service provider 192 and one or more action suggestions for the service provider 192, both to optimize one or more estimated service metrics (e.g., estimated or expected fares over a period of time). The action suggestions can include entering/exiting an offline mode with respect to the network-based service, declining or accepting invitations from the network system 100 to fulfill service requests, and the like.

The service provider optimizations 141 can be transmitted to the provider device 190 via the provider device interface 120 and the network 170. In response to receiving the service provider optimizations 141, the provider application 191 executing on the provider device 190 can cause information relating to the service provider optimizations 141 to be displayed by the provider device 190 to the service provider 192.

Methodology

Figure 2:
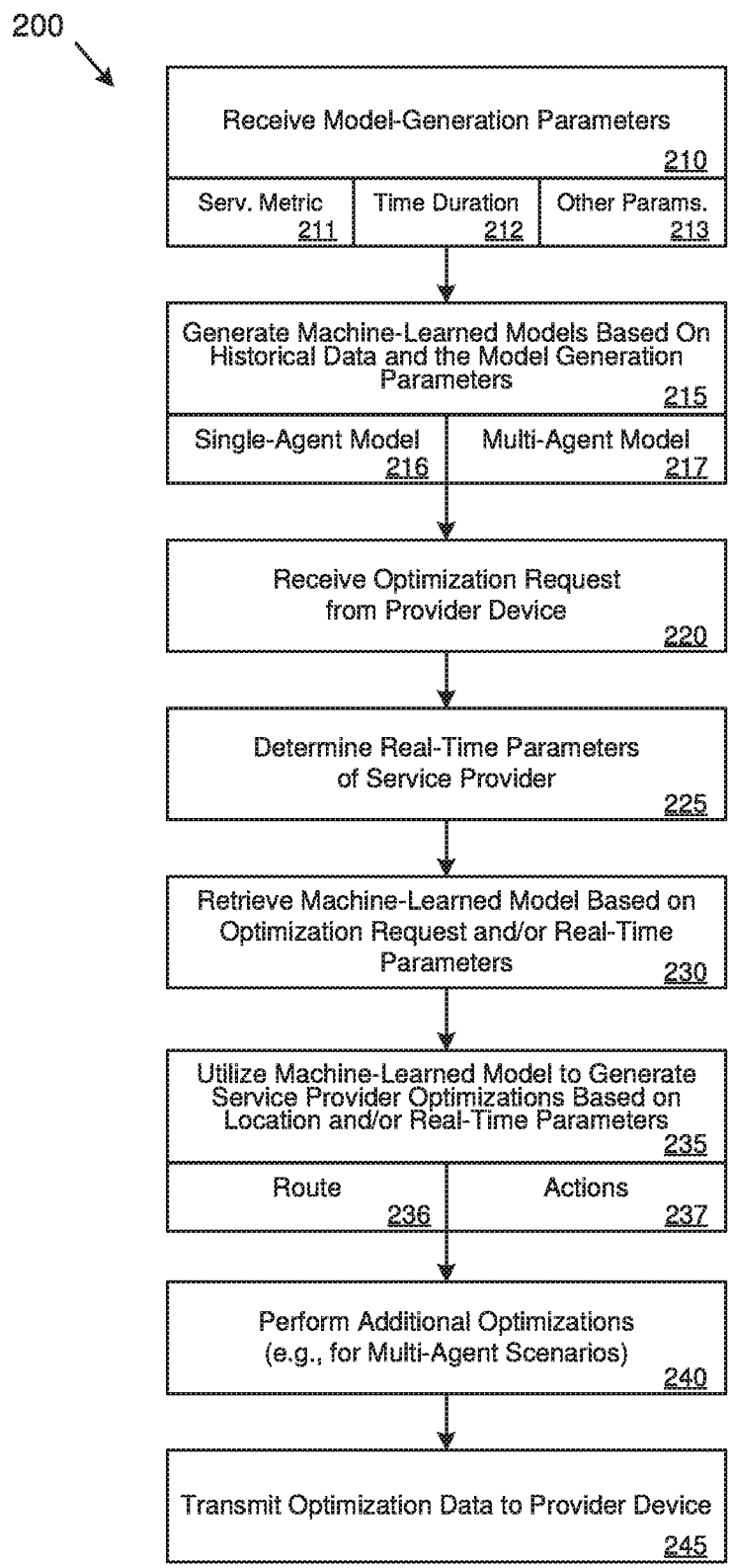
FIG. 2 is a flow chart illustrating an example method of performing service provider optimizations, in accordance with examples described herein.

FIG. 2 is a flow chart illustrating an example method of performing service provider optimizations, in accordance with examples described herein. In the below description of FIG. 2, references may be made with respect to FIG. 1. For instance, the example method illustrated in FIG. 2 can be performed by exemplary network system 100 and/or provider device 190 illustrated in and described with respect to FIG. 1.

Referring to FIG. 2, the network system can receive model generation parameters (210). The model generation parameters can specify one or more aspects of the simulations of the network-based service and/or the machine-learning process in generating the machine-learned service provider (MLSPO) models. The model-generation parameters can be predetermined or can be specified by a system administrator at the time of generating the MLSPO models or performing the simulations of the network-based service.

One model-generation parameter can be the specification of a service metric to be optimized for service providers (211). In some implementations, the service metric to be optimized can be the total fare expected to be received by the service provider for providing the network-based service. In other implementations, the MLSPO model can be generated to optimize distance traveled by the service provider or time waiting for service requests.

Another model-generation parameter can be a time duration over which to perform simulations and over which the optimizations will be performed (212). As an example, if 12 hours is specified as the time duration parameter, the network system can simulate 12 hours of activity for one or more agents in performing as service providers of the network-based service. The resulting MLSPO model based on the results of such simulations will generate service provider optimizations that optimize the specified service metric (e.g., expected fares) over a 12-hour duration. In comparison, if 2 hours is specified as the time duration parameter, the service simulation engine 130 can simulate 2 hours of activity for the one or more agents and the resulting MLSPO model will generate service provider optimizations that optimize the service metric over a 2-hour duration.

Other model-generation parameters can also be specified or predetermined (213). In one example, the geographic region over which the network-based service is managed by the network system can be divided into a plurality of geographic subdivisions. The geographic subdivisions can be hexagons or other shapes. The sizes of the geographic subdivisions can be another model-generation parameter that can be used to customize and modify the generation of the MLSPO models. As can be appreciated, smaller geographic subdivisions can yield more finely-tuned optimizations but can also increase the computational power needed to generate the MLSPO models.

The network system can generate the MLSPO models based on historical service data and the model-generation parameters (215). In generating the MLSPO models, the network system can perform a plurality of simulations of the network-based service for one or more virtual agents. A virtual agent can represent, within the simulations, a service provider of the network-based service. The simulations can be performed based on historical service data associated with the network-based service. For example, the virtual agent can be simulated to be taking various actions such as traveling in a particular direction from the agent's location during the in-between service request time period. In addition, the historical service data can be used to simulate the results of the virtual agent's performance in fulfilling simulated service requests. The historical service data can include data indicating various aspects, such as past instances of the network-based service rendered by real-world service providers. For instance, the historical service data can also indicate parameters and metrics for those past instances of the network-based service such as fare paid, time of request (e.g., time of day and/or day of week), duration of service, location of service provider when invitation was received, time and distance traveled (e.g., from location of service provider at time of accepting invitation to start location and/or from start location to service location), and the like. Results of the simulations are recorded and used to train the MLSPO model using, for example, reinforcement learning techniques designed to optimize one or more metrics (e.g., the fare). In some embodiments, a single virtual agent is used in the simulations to generate a single-agent model (216). In other implementations, multiple virtual agents are simulated and a multi-agent model can be generated (217).

In various aspects, the network system can periodically update MLSPO models based on the most-recent historical service data collected by the network system in managing the network-based service. For instance, the network system can update the MLSPO models every month based on the past 3 months or 12 months of service data collected for the network-based service. In this manner, the MLSPO models can be updated to reflect changing usage patterns of the network-based service such that optimizations generated for service providers are not out-of-date.

In performing service provider optimization for a given service provider after the machine-learning models to do so have been generated, the network system can receive an optimization request from the provider device of the given service provider (220). The service provider can interact with the provider application executing on the provider device to cause the provider device to transmit the optimization request the network system. The optimization request can indicate the current location of the service provider (e.g., via one or more geo-aware resources of the provider device) and/or the service parameter sought to be optimized. For example, after fulfilling a service request, the provider application can present a menu or soft selection feature using which the service provider can cause an optimization request to be transmitted. In doing so, the service provider can be presented with an option to select among two or more service metrics (e.g., expected fares, wait times, etc.) to be optimized.

In addition or as an alternative, the network system can automatically begin the service provider optimization process based on monitoring the location and/or the service progress of the service provider. For example, the network system can periodically receive, from the provider device, location data indicating the current location of the service provider. In response to determining that the provider device is within a predetermined distance of the service location of a service request, the network system can be triggered to begin the process of determining service provider optimizations in anticipation of the service provider completing the service request. As another example, in response to receiving a service provider's acceptance an invitation to fulfill a service request to a service location, the network system can begin to generate optimizations for the service provider based on the MLSPO models and the service location (and/or the estimated arrival time at the service location). In doing so, the optimizations can be readily transmitted to the provider device when the service provider completes the requested service at the service location.

In response to receiving the optimization request, the network system can determine one or more real-time parameters of the service provider (225). The one or more real-time parameters can reflect real-time conditions of the network-based service that may be relevant to the service provider optimization process. The MLSPO models can receive the real-time parameters as inputs in outputting the service provider optimizations.

According to embodiments, the network system can retrieve an appropriate machine-learning model based on the received optimization request (230). In one aspect, the machine-learning model can be retrieved based on the optimization service metric sought to be optimized, which can be indicated by the optimization request. For example, in response to a first optimization request indicating that the service metric sought to be optimized is the expected fare of the service provider, the network system can retrieve a machine learned model generated to optimize the expected fare. In contrast, in response to a second optimization request indicating that the service metric sought to be optimized is the wait time of the service provider (e.g., wait times for incoming invitations from the network system), the network system can retrieve machine learned model generated to optimize that service metric. In some examples, location-specific machine learned models can be used by the network system to generate service provider optimizations. Different MLSPO models can be used depending on the service provider's current location. Accordingly, the appropriate MLSPO model can also be retrieved based on the current location of the service provider indicated in the optimization request.

In yet another aspect, the appropriate MLSPO model for generating optimizations for the given service provider can be retrieved based on the real-time parameters determined for the service provider at step 225. For instance, the network system can have generated two MLSPO models—one based on a single-agent simulation of the network-based service and another based on multi-agent simulations of the network-based service. Based on a real-time parameter determined for the service provider indicating a number of service providers near the given service providers, one of the two aforementioned MLSPO models can be retrieved. For example, if the number of service providers within a predetermined distance of the service provider (or within the same geographic subdivision as the given service provider) is below a threshold value, the MLSPO model generated using single-agent simulations of the network-based service can be utilized. On the other hand, if the number of such service providers exceeds the threshold value, the MLSPO model generated using multi-agent simulations of the network-based service can be retrieved.

According to embodiments, the network system can utilize the retrieved machine learned model to generate service provider optimizations based on the current location of the service provider and/or the one or more determined real-time parameters of the service provider (235). As discussed herein, the current location of the service provider can be indicated by the optimization request or can be determined by monitoring transmission of location data from the provider device. In one implementation, the current location and/or the real-time parameters can be used as inputs to the retrieved MLSPO model. The output of the MLSPO model can include route suggestions (236) and action suggestions (237) for the service provider.

In variations, for the route suggestion, the MLSPO model can generate a direction of travel from the current location that is determined, based on simulations of the network-based service using historical data, to be optimal in maximizing or minimizing the specified service parameter. The direction of travel can be determined and represented as an angle of deviation from a line or plane of reference. For instance, the direction of travel can be determined as an angle (e.g., 30 degrees) from true north. The network system and/or the provider application executing on the provider device can be configured to generate route directions (e.g., turn-by-turn navigation directions) based on the determined angle of travel. For instance, the network system and/or the provider application can determine a navigable route that most closely takes the service provider in the angle of travel based on, for example, map data, the current location of the service provider, traffic data, and the like. A map representation of the route and/or turn-by-turn directions for the route can be displayed on the provider device for the service provider to follow.

In some cases, the route suggestion can be for the service provider to remain at or near his or her current location. For example, this can occur when the optimization is performed to maximize expected fares and the service provider is already in a location of historically high demand for the network-based service. Based on these circumstances, the network system can generate route suggestion that the service provider should remain within the geographic subdivision in which he or she is currently located. In response, the network system and/or the provider application can indicate to the service provider to remain in place (e.g., within the same geographic subdivision as the one in which service provider is currently located). As an alternative, the network system and/or the provider application can generate routing directions to a safe waiting place (e.g., to wait for the next invitation to fulfill a service request) for the service provider within the geographic subdivision. The safe waiting place can be preselected for the geographic subdivision based on map data.

According to embodiments, for the action suggestions, the MLSPO model can generate suggestions for the service provider such as entering or exiting the offline mode for the network-based service as he or she follows the routing directions from his or her current location. The suggestions can also include declining invitations to fulfill service requests, and the like.

According to embodiments, the network system is also configured to perform additional optimizations for certain scenarios such as when multi-agent optimization is performed (240). When a MLSPO model based on multi-agent simulations is used for generated service provider optimizations, multiple optimizations (e.g., one for each of the plurality of agents in the simulations) can be generated. Thus, the network system can additionally determine (e.g., by randomizing) which of the multiple optimizations is to be received by the given service provider.

The network system can transmit optimization data to the provider device of the given service provider (245). In response to receiving the optimization data, the provider device can display information corresponding to the service provider optimizations generated by the MLSPO models.

Figure 3A:
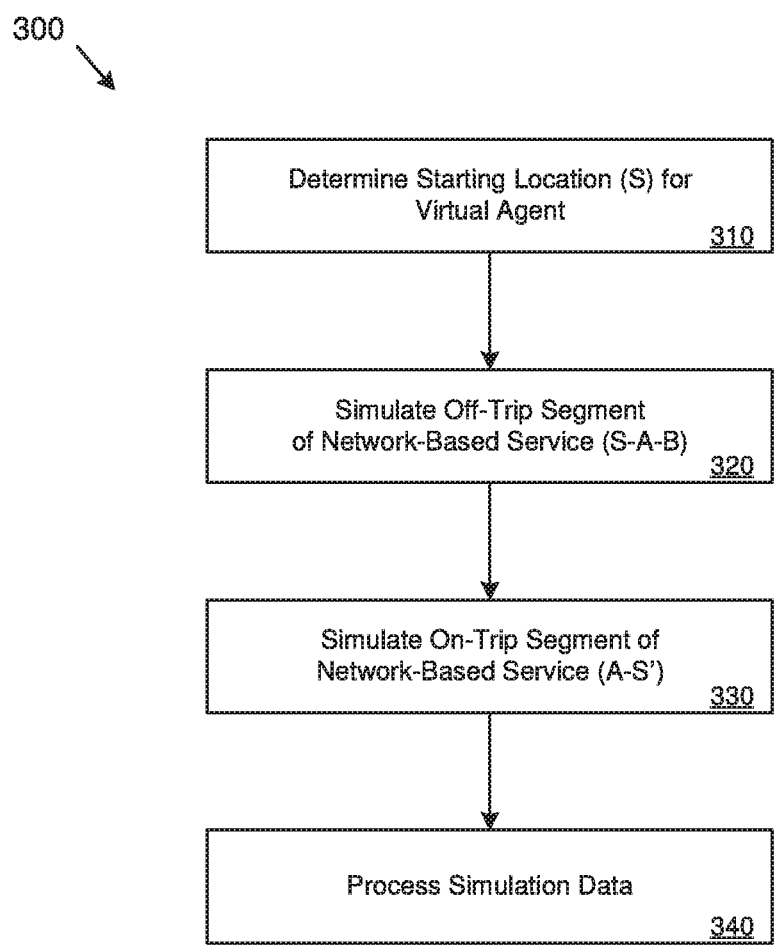
FIG. 3A is a flow chart illustrating an example method of simulating an instance of the network-based service as part of the process for generating a machine-learned service provider optimization model, in accordance with examples described herein.
Figure 3B:
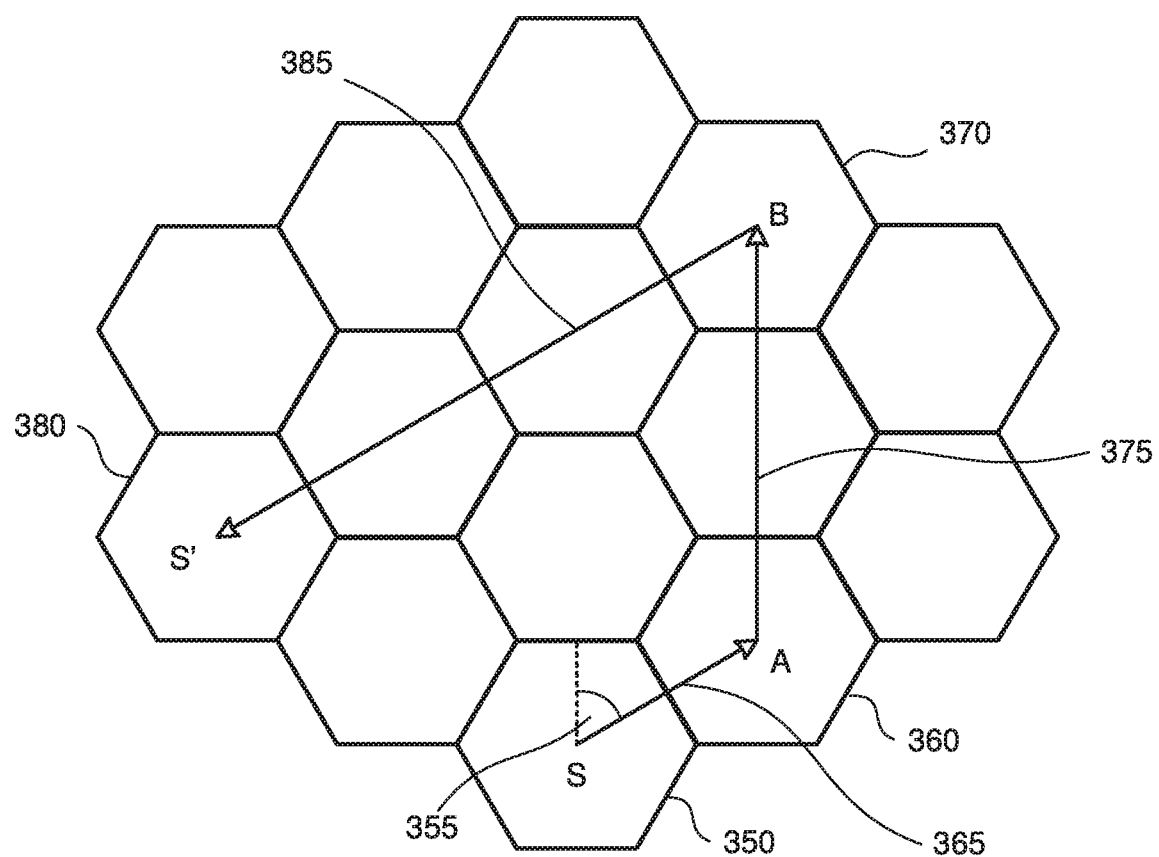
FIG. 3B is a diagram illustrating an exemplary visualization a simulation of an instance of the network-based service as part of the process for generating a machine-learned service provider optimization model, in accordance with examples described herein.

FIG. 3A is a flow chart illustrating an example method of simulating an instance of the network-based service as part of the process for generating a machine-learned service provider optimization model, as described herein. FIG. 3B is a diagram illustrating an exemplary visualization a simulation of an instance of the network-based service as part of the process for generating a machine-learned service provider optimization model, in accordance with examples described herein. Furthermore, in the below discussions of FIG. 3A and FIG. 3B, references may be made with respect to FIG. 1 and/or FIG. 2. For instance, the example method illustrated in FIG. 3A can be performed by exemplary network system 100 and/or provider device 190 illustrated in and described with respect to FIG. 1. The example method illustrated in FIG. 3A can also be performed a part of the step to generate MLSPO models (step 215) illustrated in and described with respect to FIG. 2.

Referring to FIG. 3A, the process 300 include exemplary steps to simulate an instance of the network-based service using a virtual agent. The virtual agent can be, for purposes of the simulations and the generation of a machine-learned service provider optimization (MLSPO) model, a virtual representation of a service provider taking actions in interacting with the network-based service to fulfill service requests. The virtual agent can be instantiated by the network system prior to running a plurality of simulations to generate the MLSPO model. The network system can simulate various actions performed by the virtual agent and can also simulate the results (e.g., parameters such as distance and time traveled, fare received) of those actions performed. The simulated actions and results of one or more virtual agents are recorded and used to train (e.g., using reinforcement learning) one or more MLSPO models in attempting to optimize one or more service metrics (e.g., maximizing expected fares, minimizing wait times, minimizing travel distances, etc.).

According to embodiments, the geographic region over which the network system manages the network-based service can comprise a plurality of geographic subdivisions. In one example, as illustrated in FIG. 3B, the geographic subdivisions can be hexagons. These geographic subdivisions can be used for the provision of the network-based service in the real world. For instance, dynamic determinations of metrics such as fares for a given geographic subdivision can be dependent on the presence and number of available service providers within the given geographic subdivision or neighboring geographic subdivisions. The sizes of the geographic subdivisions can be predetermined based on the various factors such as typical demand for the network-based service within each of the subdivisions.

The network system can determine an initial location (S) for the instance of the network-based service to be simulated (310). Referring to FIG. 3B, for example, to simulate for and model the behavior a virtual agent starting within subdivision 350, the network system can begin simulations for the virtual agent at subdivision 350. The process will simulate the actions and results of the virtual agent as the agent progresses from subdivision to subdivision within the geographic region in fulfilling the network-based service. In the example illustrated in FIG. 3B, the virtual agent is simulated to progress from subdivision 350 to subdivision 360 to subdivision 370 and finally to subdivision 380. A simulation of the next instance (not illustrated in FIG. 3B) of the virtual agent can thus begin at subdivision 380.

According to embodiments, simulating an instance of the network-based service includes simulating actions and results of the virtual agent during an off-service segment, a transit segment, and an on-service segment. The off-service segment can refer to the time period between completing a prior service request and accepting an invitation to fulfill a service request. The transit segment can refer to the time period between accepting the invitation and arrival at the start location of the service request. And the on-service segment can refer to the time period during which the virtual agent is simulated to be traveling from the start location to the service location in fulfillment of the service request.

The network system can simulate the off-service segment of the network-based service (320). Referring to FIG. 3B, the off-service segment can be segment 365 from the initial location (S) in subdivision 350 to a location (A) in subdivision 360. The network system can also simulate a transit segment, which can be a segment 375 from the location (A) in subdivision 360 to a location (B) in subdivision 370. The segment 365 can represent the actions of the virtual agent before the agent accepts a (virtual) invitation to fulfill a service request. The segment 375 can represent the actions of the virtual agent as the agent proceeds to a start location (location (B)) of the service request. The network system can also simulate on-service segment 385 (330) from start location (B) located in subdivision 370 to the service location (S') located in subdivision 380.

In some embodiments, one or more of the segments 365, 375, and/or 385 may not be individually or explicitly simulated. Rather, in addition or as an alternative, the approach taken to simulate the virtual agent actions during the off-service segment can be done by simulating the virtual agent traveling in a given direction from the initial location (S). The given direction of travel can be represented as an angle 355 from a reference direction or reference line. In some examples, the network system can perform a general statistical modeling, based on historical service data, of past actions and results of the service providers traveling in a given direction rather than performing detailed simulations of the individual segments 365, 375, and/or 385. In one variation, the network system can model the virtual agent traveling from the initial location (S) in a direction represented by angle 355 and simulating the parameters associated with the network-based service in the virtual agent arriving at the service location (S'). In many cases, particularly where the geographical region comprises a great number of subdivisions, this can result in lower demand on computational power to perform the simulations. Furthermore, the network system can be configured to simulate virtual agent actions for a plurality of angles of travel (e.g., every 20°) in order to obtain a complete set of simulations for the virtual agent starting from initial location (S). For instance, the network system can perform a first set of simulations for the virtual agent with an angle of travel of 0° from the initial position S, a second set of simulations for the virtual agent with an angle of travel of 20°, a third set of simulations for the virtual agent with an angle of 40°, etc. In this manner, the network system can simulate a complete set of possible routes and actions of the service provider in determining one or more directions of travel and/or actions to optimize the one or more service metrics.

The simulation can be performed based on historical service data maintained by the network system. In one example, the network system can perform statistical modeling based on the historical service data to obtain results (e.g., by computing service parameters) of the virtual agent performing the on-service segment. Computed service parameters such as fare received, time elapsed, distance traveled, etc. can be computed and used to train the MLSPO model (340). After performing the simulation of the virtual agent's travel from initial location (S) to the service location (S'), the network system can continue performing additional simulations for the virtual agent. For instance, the network system can perform an additional simulation of the virtual agent's actions from S' to the next service location (S", not illustrated in FIG. 3B).

Figure 4:
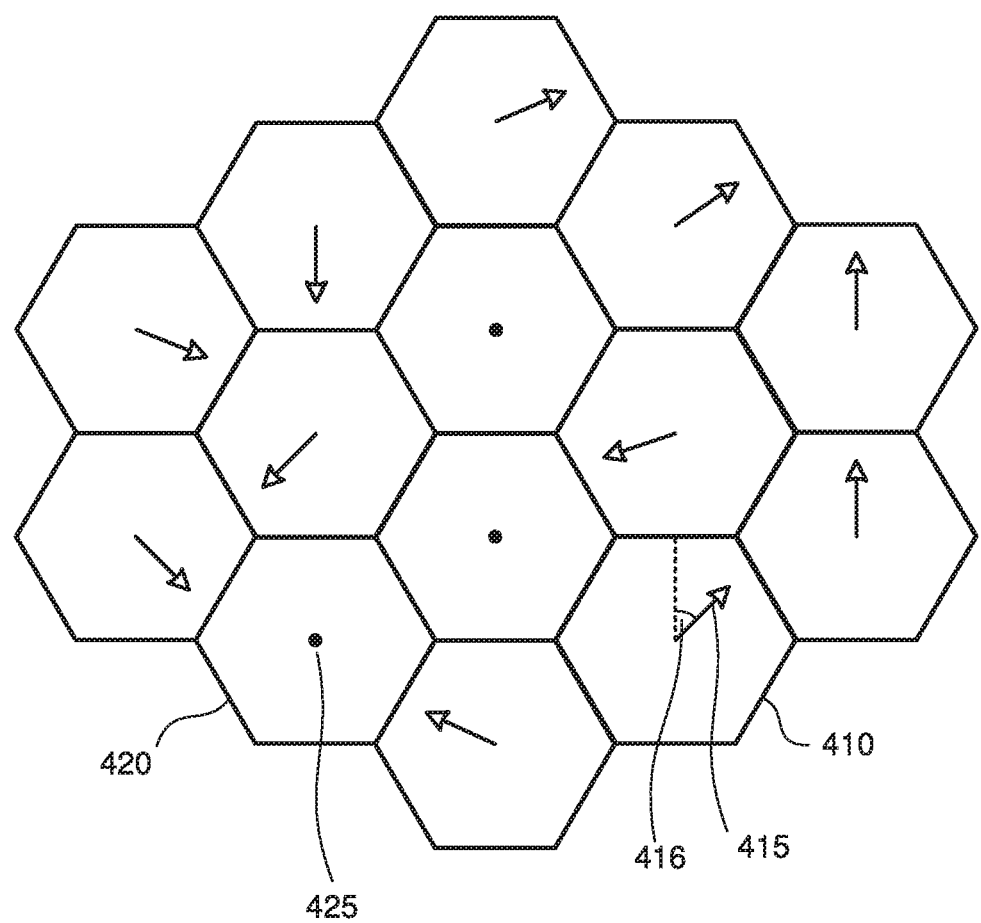
FIG. 4 is a diagram illustrating an exemplary visualization of service provider optimizations provided by an exemplary machine-learned service provider optimization model, in accordance with examples described herein.

FIG. 4 is a diagram illustrating an exemplary visualization of service provider optimizations provided by an exemplary machine-learned service provider optimization (MLSPO) model, in accordance with examples described herein. As in FIG. 3B, the geographic region can comprise a plurality of subdivisions such as subdivision 410 and 420.

For subdivision 410, the MLSPO model can generate route direction of travel to optimize one or more service metrics for the service provider. Thus, if the service provider is determined to be located within the subdivision 410, and service provider optimization is requested, the network system can generate a routing direction 415 for the service provider. In some examples, the routing direction 415 outputted by the MLSPO model can be a direction of travel represented as an angle 416 from reference direction (e.g., cardinal north). The network system and/or the provider application executing on the provider device can be configured to generate route directions (e.g., turn-by-turn navigation directions) based on the routing direction 415 and/or the angle 416. For instance, the network system and/or the provider application can determine a navigable route that most closely takes the service provider that conforms to the angle 416 based on, for example, map data, the current location of the service provider, traffic data, and the like. A map representation of the route and/or turn-by-turn directions for the route can be displayed on the provider device for the service provider to follow.

In contrast, for subdivision 420, the output of the MLSPO model can be a direction for the service provider to remain in place 425 (or within the subdivision 420). At a high level, this can occur, for example, when the service provider requests to optimize expected fares and the service provider is already located in an area (e.g., subdivision 420) of high demand for the network-based service. Thus, to optimize expected fares, the MLSPO model may generate a route direction informing the service provider to remain in place.

Hardware Diagrams

Figure 5:
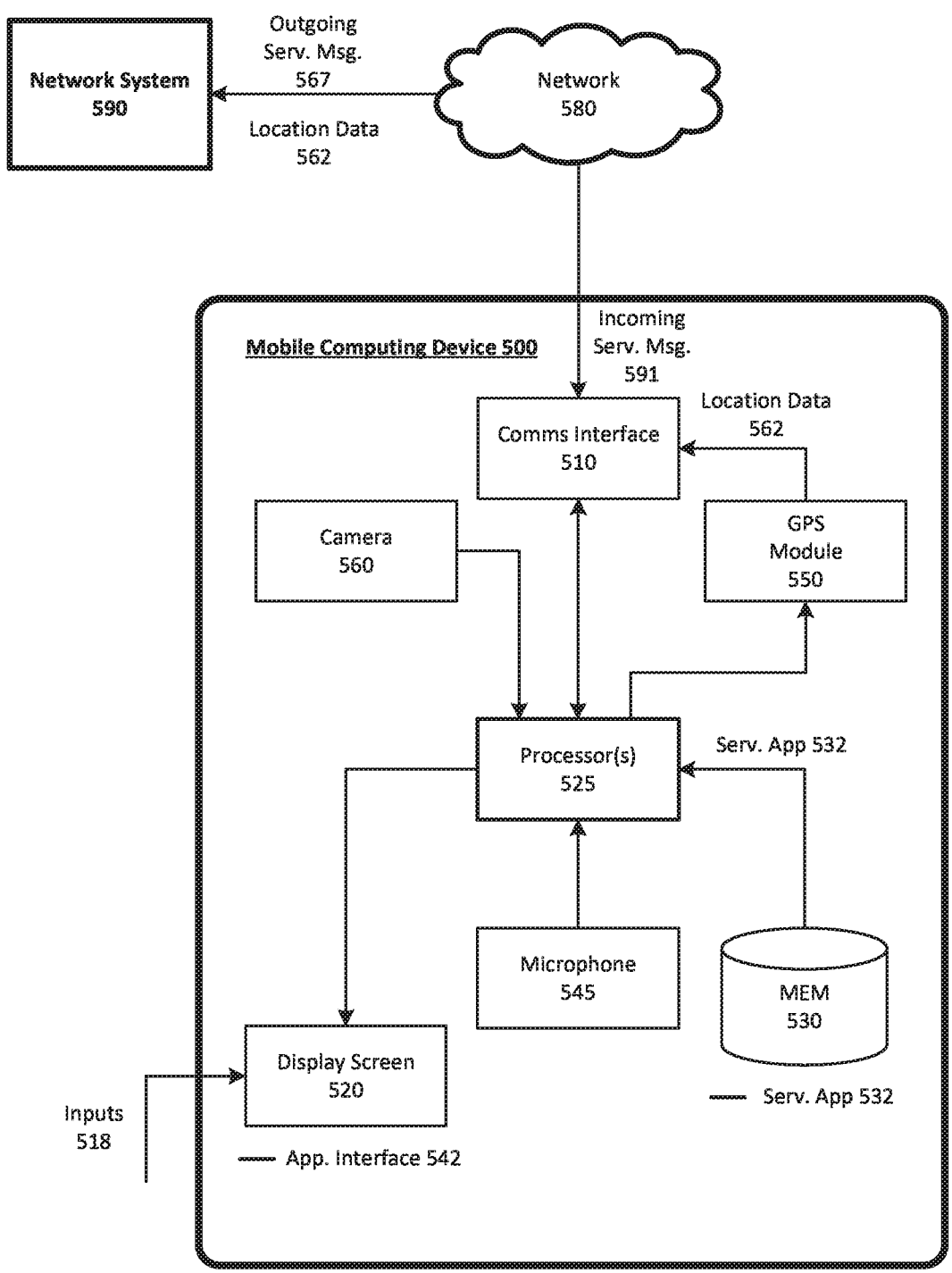
FIG. 5 is a block diagram illustrating an example mobile computing device, in accordance with examples described herein.

FIG. 5 is a block diagram illustrating an example mobile computing device, in accordance with examples described herein. In many implementations, the mobile computing device 500 can be a smartphone, tablet computer, laptop computer, VR or AR headset device, and the like. In the context of FIG. 1, the user device 180 and/or the provider device 190 may be implemented using a mobile computing device 500 as illustrated in and described with respect to FIG. 4.

According to embodiments, the mobile computing device 500 can include typical telephony features such as a microphone 570, a camera 540, and a communication interface 510 to communicate with external entities (e.g., network system 590 implementing or managing the network-based service) using any number of wireless communication protocols. The mobile computing device 500 can store a designated application (e.g., a service application 532) in a local memory 530. The service application 532 can correspond to one or more user applications for implementations of the mobile computing device 500 as user devices for the network-based service. The service application 532 can also correspond to one or more provider applications for implementations of the mobile computing device 500 as provider devices for the network-based service.

In response to an input 518, the processor can execute the service application 532, which can cause an application interface 542 to be generated on a display screen 520 of the mobile computing device 500. In implementations of the mobile computing device 500 as user devices, the application interface 542 can enable a user to, for example, request for the network-based service. The request for service can be transmitted to the network system 590 as an outgoing service message 567.

In various examples, the mobile computing device 500 can include a GPS module 550, which can provide location data 562 indicating the current location of the mobile computing device 500 to the network system 590 over a network 580. In some implementations, other location-aware or geolocation resources such as GLONASS, Galileo, or BeiDou can be used instead of or in addition to the GPS module 560. The location data 562 can be used in generating a service request, in the context of the mobile computing device 500 operating as a user device. For instance, the user application can set the current location as indicated by the location data 562 as the default start location (e.g., a location where a selected service provider is to rendezvous with the user).

Figure 6:
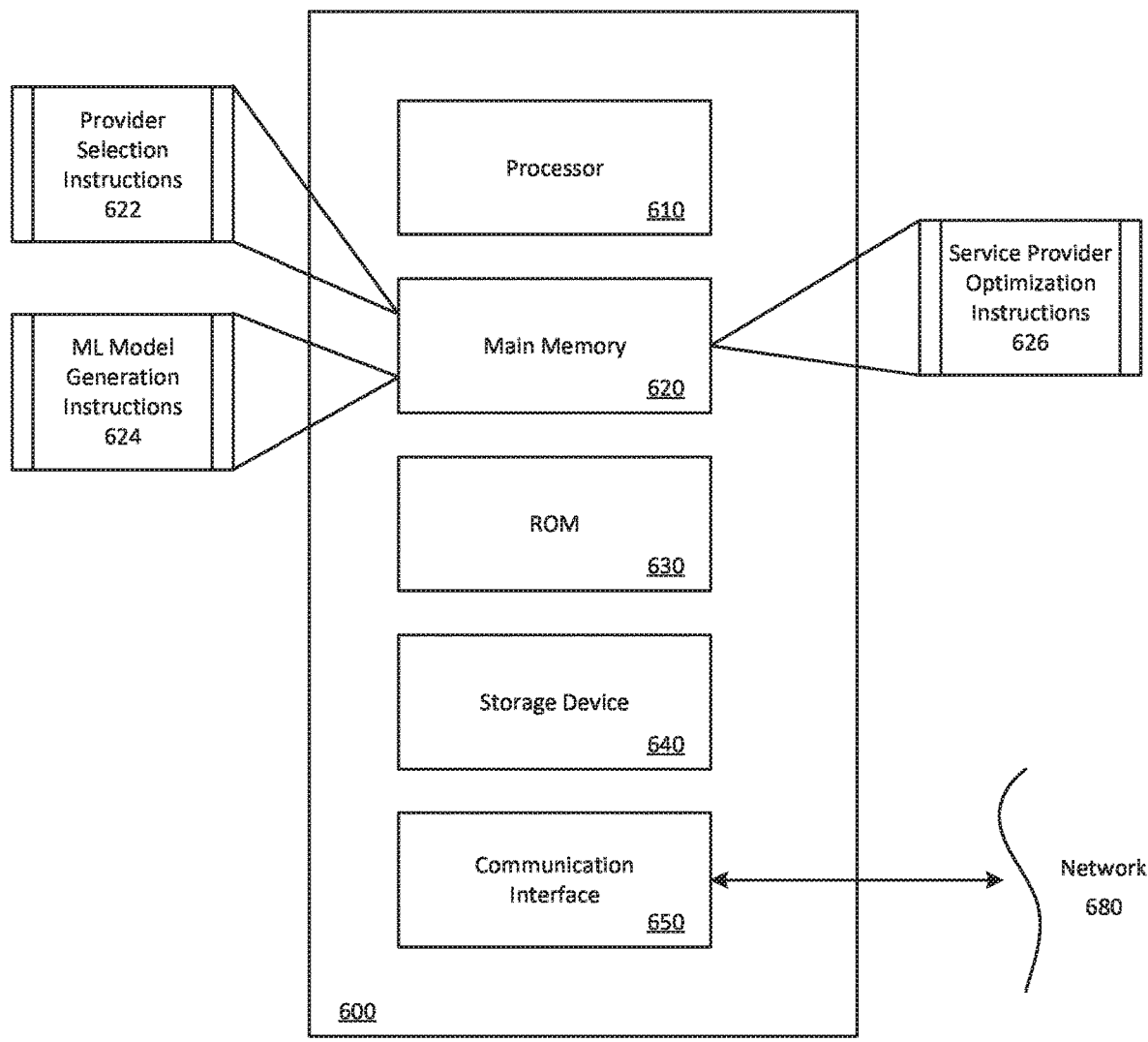
FIG. 6 is a block diagram that illustrates a computer system upon which examples described herein may be implemented.

FIG. 6 is a block diagram that illustrates a computer system upon which examples described herein may be implemented. A computer system 600 can represent, for example, hardware for a server or combination of servers that may be implemented as part of a network service for providing on-demand services. In the context of FIG. 1, the network system 100 may be implemented using a computer system 600 or combination of multiple computer systems 600 as described by FIG. 6.

In one aspect, the computer system 600 includes processing resources (e.g., processor 610), a main memory 620, a memory 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the memory 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., a cellular network) through use of a network link (wireless or wired). Using the network link, the computer system 600 can communicate with one or more computing devices, one or more servers, and/or one or more self-driving vehicles. In accordance with some examples, the computer system 600 receives service requests from mobile computing devices of individual users. The executable instructions stored in the memory 630 can include provider selection instructions 622, machine-learned model generation instructions 624, and service provider optimization 626 to perform one or more of the methods described herein when executed.

By way of example, the instructions and data stored in the memory 620 can be executed by the processor 610 to implement an example network system 100 of FIG. 1. In performing the operations, the processor 610 can handle service requests and provider statuses and submit service invitations to facilitate fulfilling the service requests. The processor 610 executes instructions for the software and/or other logic to perform one or more processes, steps and other functions described with implementations, such as described herein with respect to FIGS. 1-4.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system for managing a network-based service, comprising:
   one or more processors; and
   one or more memory resources storing instructions that, when executed by the one or more processors of the network system, cause the network system to:
   generate, based on a set of historical data associated with the network-based service, a machine-learned optimization model for generating action recommendations for service providers of the network-based service;

determine, based on a current location of a service provider and the machine-learned optimization model, one or more action recommendations for optimizing one or more estimated service metrics for the service provider in fulfilling one or more service requests of the network-based service;

transmit, to a provider device of the service provider, a set of data to cause the provider device to display information regarding the determined one or more action recommendations for the service provider; and wherein the one or more action recommendations includes: (i) a recommended direction of travel for the service provider while the service provider is traveling on an off-service segment, and (ii) a recommendation for the service provider to enter an offline state with respect to the network-based service.

2. The network system of claim 1,
wherein the recommended direction of travel is defined as an angle of travel with respect to a reference direction;
wherein the executed instructions further cause the network system to generate, based on the angle of travel with respect to the reference direction and the current location of the service provider, navigation instructions for the service provider; and
wherein the information displayed on the provider device regarding the determined one or more action recommendations for the service provider correspond to the navigation instructions.

3. The network system of claim 1, wherein the one or more action recommendations further includes a recommendation for the service provider to travel to a pre-determined waiting area for waiting for an invitation to fulfill a service request.

4. The network system of claim 1, wherein generating the machine-learned optimization model further includes:
performing, for a first virtual agent based on the set of historical data, a first set of agent-based simulations of the network-based service including a first agent-based simulation from a first location to a second location; and
determining, for each one the first set of agent-based simulations of the network-based service, a corresponding value of a first service metric of the one or more estimated service metrics based on the set of historical data.

5. The network system of claim 4, wherein the machine-learned optimization model is trained based on results of the first set of agent-based simulations to maximize or minimize the first service metric.

6. The network system of claim 4, wherein generating the machine-learned optimization model further includes:
performing, for a second virtual agent based on the set of historical data, a second set of agent-based simulations of the network-based service.

7. The network system of claim 1, wherein the current location of the service provider is provided as an input to the machine-learned optimization model to determine the one or more action recommendations for optimizing one or more estimated service metrics for the service provider in fulfilling one or more service requests of the network-based service.

8. The network system of claim 1, wherein the executed instructions further cause the network system to:
determine a real-time parameter based on one or more real-time conditions of the network-based service; and
wherein the real-time parameter as an input to the machine-learned optimization model to determine the one or more action recommendations for optimizing one or more estimated service metrics for the service provider in fulfilling one or more service requests of the network-based service.

9. The network system of claim 8, wherein the real-time parameter is a parameter indicating a number of other available service providers within a predetermined distance of the service provider.

10. The network system of claim 1, wherein the set of historical data indicates respective values of a service parameter associated with each of a plurality of past instances of the network-based service.

11. The network system of claim 1, wherein the one or more estimated service metrics includes one or more of the following service metrics for the service provider in fulfilling requests for the network-based service over a future period of time: (i) expected fares, (ii) expected wait times, or (iii) expected travel distances.

12. The network system of claim 11, wherein the future period of time is specified by the service provider and wherein the one or more action recommendations is determined based further on the future period of time.

13. The network system of claim 1, wherein the machine-learned optimization model is generated using reinforcement learning.

14. A computer-implemented method comprising:
generating, based on a set of historical data associated with a network-based service, a machine-learned optimization model for generating action recommendations for service providers of the network-based service;
determining, based on a current location of a service provider and the machine-learned optimization model, one or more action recommendations for optimizing one or more estimated service metrics for the service provider in fulfilling one or more service requests of the network-based service;
transmitting, to a provider device of the service provider, a set of data to cause the provider device to display information regarding the determined one or more action recommendations for the service provider; and
wherein the one or more action recommendations includes: (i) a recommended direction of travel for the service provider while the service provider is traveling on an off-service segment, and (ii) a recommendation for the service provider to enter an offline state with respect to the network-based service.

15. The computer-implemented method of claim 14, wherein generating, based on the set of historical data associated with the network-based service, the machine-learned optimization model for generating action recommendations for service providers of the network-based service comprises:
performing, for a first virtual agent based on the set of historical data, a first set of agent-based simulations of the network-based service including a first agent-based simulation from a first location to a second location; and
determining, for each one the first set of agent-based simulations of the network-based service, a corresponding value of a first service metric of the one or more expected service metrics based on the set of historical data; and wherein the machine-learned optimization model is trained based on results of the first set of agent-based simulations to maximize or minimize the first service metric.

16. A non-transitory computer-readable medium storing instructions that, when executed by one or more processors of a network system, cause the network system to:

generate, based on a set of historical data associated with a network-based service, a machine-learned optimization model for generating action recommendations for service providers of the network-based service;

determine, based on a current location of a service provider and the machine-learned optimization model, one or more action recommendations for optimizing one or more estimated service metrics for the service provider in fulfilling one or more service requests of the network-based service;

transmit, to a provider device of the service provider, a set of data to cause the provider device to display information regarding the determined one or more action recommendations for the service provider; and wherein the one or more action recommendations includes: (i) a recommended direction of travel for the service provider while the service provider is traveling on an off-service segment, and (ii) a recommendation for the service provider to enter an offline state with respect to the network-based service.

17. The non-transitory computer-readable medium of claim 16, wherein generating, based on the set of historical data associated with the network-based service, the machine-learned optimization model for generating action recommendations for service providers of the network-based service comprises:

performing, for a first virtual agent based on the set of historical data, a first set of agent-based simulations of the network-based service including a first agent-based simulation from a first location to a second location; and determining, for each one the first set of agent-based simulations of the network-based service, a corresponding value of a first service metric of the one or more expected service metrics based on the set of historical data; and wherein the machine-learned optimization model is trained based on results of the first set of agent-based simulations to maximize or minimize the first service metric.

18. The computer-implemented method of claim 14, wherein the one or more action recommendations further includes a recommendation for the service provider to travel to a pre-determined waiting area for waiting for an invitation to fulfill a service request.

19. The computer-implemented method of claim 15, wherein the machine-learned optimization model is trained based on results of the first set of agent-based simulations to maximize or minimize the first service metric.

20. The computer-implemented method of claim 15, wherein generating the machine-learned optimization model further includes:

performing, for a second virtual agent based on the set of historical data, a second set of agent-based simulations of the network-based service.

\* \* \* \* \*